June 2, 1959
G. S. ALLIN, SR
2,888,758
WHEELED SCRAPER
Filed April 15, 1955
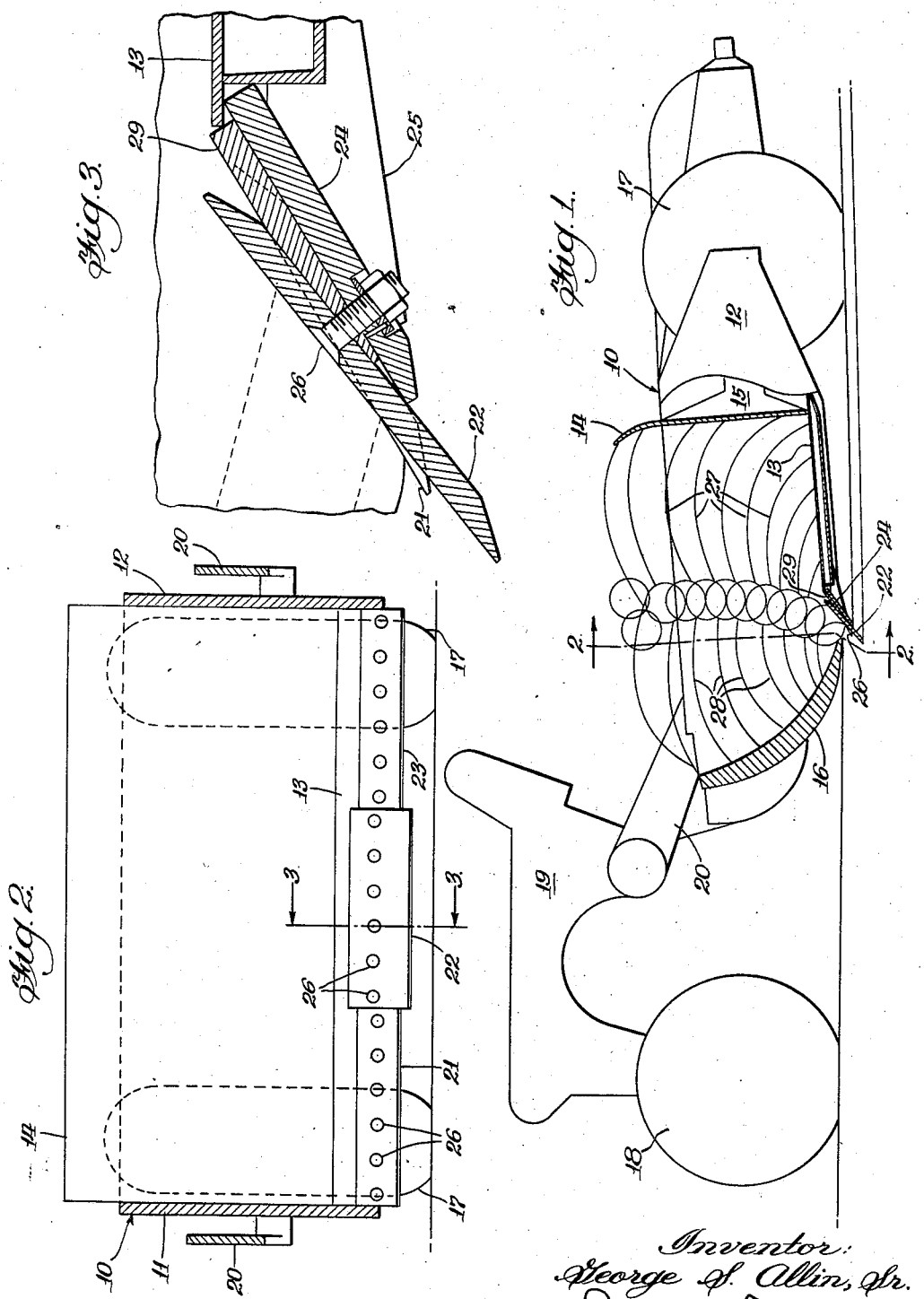
Inventor:
George S. Allin, Sr.
Paul O. Pippes
Atty.

United States Patent Office 2,888,758
Patented June 2, 1959

2,888,758
WHEELED SCRAPER

George S. Allin, Sr., Flossmoor, Ill., assignor to International Harvester Company, a corporation of New Jersey Application April 15, 1955, Serial No. 501,668

9 Claims. (Cl. 37—126)

This invention relates generally to earth moving equipment and more specifically to an improved cutting edge for a wheeled earth scraper.

Wheeled scrapers, as generally known in the art, comprise an adjustable bowl and a movable apron for closing the bowl carried by two or more wheels. These scrapers are generally pulled by a prime mover such as a crawler tractor. The lower forward edge of the bowl is provided with a cutting edge so that in operation of the scraper, the bowl is lowered until the cutting edge bites into the earth to be scraped into the bowl. The apron of the bowl is partially opened in the scraping operation and the earth being scraped will boil into the area defined by the apron and the bowl. Many types of cutting edges have been used in the art in an effort to produce an arrangement whereby maximum filling of the area defined by the apron and the bowl will take place during a scraping operation. Generally however, the problem of a suitable cutting edge to provide maximum filling of the scraper has been a difficult one and the results have not been entirely satisfactory.

It is the object of the present invention to provide a cutting edge for a wheeled scraper which will effectively and efficiently completely fill the area defined by the apron and the bowl of the scraper.

It is a further object of the present invention to provide a cutting edge for a scraper bowl used in cooperation with an apron which will cause the earth to be loaded or boiled itno the area defined by the apron and the scraper bowl in a proper and efficient pattern.

Other objects and the features of the present invention will be apparent upon a reading of the following specification and drawing of which:

Figure 1 shows a side plan view of a scraper with the apron bowl and cutting edge in cross section and embodying the present invention;

Figure 2 is an enlarged cross sectional view of the scraper shown in Figure 1 and taken along the line 2—2; and Figure 3 is a partial enlarged cross sectional view of the structure shown in Figures 1 and 2 and taken along the line 3—3 of Figure 2.

The present embodiment is the preferred embodiment, but it is to be understood that changes can be made in the present embodiment by one skilled in the art without departing from the spirit and scope of the present invention.

For a detailed description of the present invention reference is made to the drawnig. The present embodiment comprises a scraper bowl 10 formed with a pair of spaced-apart side walls 11 and 12 and a bottom wall 13. The forward end of the bowl is open. The rearward end of the bowl 10 is provided with an ejector plate 14. Any operating means 15, commonly known in the art, is mounted to the rear face of the ejector plate 14, and operates to move the ejector plate forwardly between the side walls 11 and 12 of the bowl 10 to eject any load from the bowl 10. A closure member or apron 16 is provided for selectively closing the front end of the bowl 10. The apron 16 is pivotally carried over the open end of the bowl 10. Raising and lowering means (not shown) are provided for the apron 16 to control the pivoting of the apron 16 for varying the opening between the bottom edge of the apron 16 and the forward edge of the bowl 10 necessary for the various operations of the scraper in digging, carrying and dumping. The apron 16 and the bowl 10 together define a volume for receiving and containing a load of material scraped or cut therein. The volume defined by the bowl 10 is considerably greater, at least twice as great, as the volume defined by the apron 16. The bowl 10 is carried at the rear end thereof by a pair of wheels 17. To support the forward end of the bowl 10 a wheel assembly 18, a yoke 19 and a pair of yoke arms 20 are provided. The yoke 19 is carried by the wheel assembly 18 and is connected to a prime mover or tractor (not shown) to pull the scraper and to provide power for operating the scraper. The pair of yoke arms 20 are pivotally mounted between the yoke 19 and the sides 11 and 12 of the bowl 10. Power means (not shown) carried by the yoke 19 and operated from the prime mover, operates to control the pivoting of the yoke arms 20 relative to the yoke 19 so that the forward end of the bowl 10 may be selectively raised or lowered to fulfill the various functions of the scraper in digging, carrying and dumping.

The forward marginal edge of the bottom wall floor section 13 of the scraper is provided with a removably mounted cutting edge comprising three cutting elements 21, 22 and 23. To properly support the cutting elements 21, 22 and 23, the forward marginal edge of the floor section 13 of the bowl 10 is provided with an inclined plate 24 which is secured to the floor section 13 and the side walls 11 and 12. Bracing elements 25 mounted to the plate 24 and the floor section 13 aid in supporting the plate 24 and add rigidity to the structure. The cutting elements 21, 22 and 23 are formed as flat strip members and have beveled longitudinal edge portions for proper cutting into a material to be scraped. The cutting elements 21 and 23 are mounted to the plate 24 on opposite sides of the bowl 10. The cutting element 22 is also mounted to the plate 24 and is positioned between the cutting elements 21 and 23 substantially at the transverse center of the bowl 10. The cutting elements 21, 22 and 23 are mounted to the plate 24 by means of fasteners 26. Each of the cutting elements 21, 22 and 23 are of a length substantially equal to one third of the distance between the sides 11 and 12 of the bowl 10. The cutting elements 21 and 23 are inclined at a relatively low angle to the ground. This relatively low angle is one which is selected to cause substantially all of the material cut thereby to boil rearwardly into the bowl substantially as shown by the lines 27. The cutting element 22 is disposed at a relatively higher angle, with respect to ground, than the angle of incline of the cutting elements 21 and 23. The incline of the cutting element 22 is produced by the beveled plate 29 which is positioned between the upper longitudinal portion of cutting element 22 and the plate 24, and the angle of incline is selected as that angle which will cause a substantial amount of the material cut by the cutting element 22 to boil forwardly onto the apron 16 substantially as shown by the lines 28. The incline of the cutting element 22 may also be produced omitting plate 29 and forming the plate 24 with a center section inclined and raised above the side sections thereof. Apparently due to the relatively high angle of cutting element 22, it has been found that of the total material cut by cutting element 22, a certain portion thereof is bulldozed ahead of the cutting element 22. It has further been found that this invention efficiently and uniquely disposes of that bulldozed material, which tends to spread in front of the cutting elements 21 and 23 and is thereby directed into the bowl 10 by the cutting elements 21 and 23 with a minimum power requirement. Additionally, since the volume defined by the bowl 10 is substantially twice as great as the volume over the apron 16, it has been found that with the two cutting elements 21 and 23 and the one cutting element 22 an ideal proportioning of the total load being cut is effectively accomplished. It appears that the cutting elements 21, 22 and 23 due to their particular dispositions relative to the bowl and relative to each other, and their particular inclined angles relative to the ground and relative to each other, combine with the apron 16 and the bowl 10 to produce an earth scraper which operates to completely fill the available area with the maximum possible load.

Having described the invention, what is considered new and desired to be protected by Letters Patent is:

1. In a wheeled earth scraper having a bowl and having an apron pivotally and adjustably mounted over the open forward end of said bowl, and wherein the volume of the bowl is substantially larger than the volume over the apron, a cutting edge assembly comprising a flat strip shaped cutting edge mounted on the transverse central portion of the lower open forward end of said bowl at a certain angle to ground level and operative to cut and substantially direct one portion of any material being cut into the volume defined by said apron, and a pair of second flat strip shaped cutting edges mounted one on each side of said first cutting edge in longitudinal alignment therewith to the lower open forward end of said bowl at a lower angle than said certain angle and operative to cut and substantially direct another substantially larger portion of any material being cut substantially into the volume defined by said bowl.

2. In a wheeled earth scraper having a bowl and having an apron pivotally and adjustably mounted over the open forward end of said bowl, a flat strip shaped cutting edge assembly comprising three cutting elements, one of said cutting elements mounted on the lower open forward end of said bowl substantially at the transverse center thereof and being inclined at a certain angle to ground level so that when said scraper is moved said one cutting element operates to cut and substantially direct one portion of the material being cut into the volume defined by said apron, the other two of said three cutting elements positioned on opposite sides of said one cutting element in longitudinal alignment therewith and secured to the lower open forward end of said bowl at a second certain inclined angle less than said first certain angle so that when said scraper is moved said other two cutting elements operate to cut and substantially direct the remainder of the material being cut substantially into the volume defined by said bowl.

3. In a wheeled earth scraper having a bowl and having an apron pivotally and adjustably mounted over the open forward end of said bowl and wherein the volume of the bowl is substantially larger than the volume over the apron, a cutting edge assembly comprising three flat strip shaped cutting elements, one of said cutting elements mounted on the lower open forward end of said bowl and positioned substantially at the transverse center of said bowl and inclined at a certain angle to ground level so that when said scraper is moved said one cutting element operates to cut and substantially direct one portion of the material being cut into the volume defined by the apron, the other two of said three cutting elements mounted on the lower open forward end of said bowl and positioned one on each side of said one cutting element in longitudinal alignment therewith and inclined at a second certain angle less than said first certain angle so that when said scraper is moved said other two cutting elements operate to cut and substantially direct another substantially larger portion of the material being cut substantially into the volume defined by said bowl.

4. In a wheeled earth scraper having a bowl and having an apron pivotally and adjustably mounted over the open forward end of said bowl and wherein the volume of the bowl is substantially larger than the volume over the apron, a cutting element comprising a flat strip having one longitudinal edge thereof beveled, said cutting element removably mounted to the lower open forward end of said bowl with said beveled longitudinal edge projecting below said bowl and so that said cutting element is inclined relative to the ground at a certain angle, second and third cutting elements comprising a pair of flat strips each having one longitudinal edge thereof beveled, said second and third cutting elements removably mounted to the lower open forward end of said bowl with said second and third cutting elements positioned on opposite sides of said first cutting element and in a longitudinal alignment therewith, said second and third cutting elements inclined at a certain angle relative to ground level and less than said certain angle of said one cutting element, the angles of inclination of said first, second and third cutting elements being selected so that when said scraper is moved said first cutting element operates to cut and substantially direct one portion of the material being cut into the volume defined by said apron and said second and third cutting elements operate to cut and substantially direct another substantially larger portion of the material being cut substantially into the volume defined by said bowl.

5. In an earth scraper, a bowl formed to have an open forward end and being supported at the rear thereof by a wheel assembly, an apron pivotally and adjustably mounted over the open forward end of said bowl, a cutting edge assembly for said bowl comprising a flat strip shaped cutting edge mounted on the transverse central portion of the lower open forward end of said bowl at a certain angle relative to ground level and operative to cut and substantially direct one portion of any material being cut into the volume defined by said apron, and a pair of second flat strip shaped cutting edges mounted on opposite sides of said first cutting edge and on the lower open forward end of said bowl at an angle less than said certain angle and operative to cut and substantially direct the remaining portion of any material being cut substantially into the volume defined by said bowl.

6. In an earth scraper, a bowl having an open forward end and being supported at the rear thereof by a wheel assembly, an apron pivotally and adjustably mounted over the open forward end of said bowl, said bowl and said apron relatively arranged to provide a substantially larger volume in said bowl than the volume over said apron, a cutting edge assembly for said bowl comprising a flat strip shaped cutting edge mounted on the transverse central portion of the lower open forward end of said bowl at a certain angle to ground level and operative to cut and substantially direct one portion of any material being cut into the volume defined by said apron, and a pair of second flat strip shaped cutting edges mounted one on each side of said first cutting edge in longitudinal alignment therewith and on the lower open forward end of said bowl at a lesser angle relative to said certain angle and operative to cut and substantially direct another substantially larger portion of any material being cut substantially into the volume defined by said bowl.

7. In an earth scraper, a bowl having an open forward end and being supported at the rear thereof by a wheel assembly, an apron pivotally and adjustably mounted over the open forward end of said bowl, a cutting edge assembly comprising three flat strip shaped cutting elements, one of said cutting elements mounted on the lower open forward end of said bowl substantially at the transverse center thereof and being inclined at a certain angle to ground level so that when said scraper is moved forwardly said one cutting element operates to cut and substantially direct one portion of the material being cut into the volume defined by said apron, the other two of said three cutting elements positioned on opposite sides of said one cutting element in longitudinal alignment therewith and secured to the lower open forward end of said bowl at a second certain angle less than said first certain angle so that when said scraper is moved said other two cutting elements operate to cut and substantially direct the remainder of the material being cut substantially into the volume defined by said bowl.

8. In an earth scraper, a bowl formed to have an open forward end and being supported at the rear thereof by a wheel assembly, an apron pivotally and adjustably mounted over the open forward end of said bowl, said bowl and said apron relatively formed to provide a substantially larger volume within said bowl than the volume over said apron, a cutting edge assembly comprising three flat strip shaped cutting elements, one of said cutting elements mounted on the lower open forward end of said bowl and positioned substantially at the transverse center of said bowl and inclined at a certain angle to ground level so that when said scraper is moved forwardly said one cutting element operates to cut and substantially direct one portion of the material being cut into the volume defined by said apron, the other two of said three cutting elements mounted on the lower open forward end of said bowl and positioned one on each side of said one cutting element in longitudinal alignment therewith and inclined at a second certain angle less than said certain angle so that when said scraper is moved forwardly said other two cutting elements operate to cut and substantially direct another substantially larger portion of the material being cut into the volume defined by said bowl, said other two of said three cutting elements further operating to direct any material bulldozed by said one cutting element in the path of said other two of said three cutting elements substantially into the volume defined by said bowl.

9. In an earth scraper, a bowl formed to have an open forward end and being supported at the rear thereof by a wheel assembly, an apron pivotally and adjustably mounted over the open forward end of said bowl, said bowl and said apron relatively formed so that the volume defined by said bowl is at least twice as great as the volume over said apron, a cutting element comprising a flat strip having one longitudinal edge thereof beveled and having a length substantially equal to one third of the length of the lower open forward end of said bowl, said cutting element removably mounted to said lower open forward end of said bowl with the beveled longitudinal edge projecting below said bowl and so that said cutting element is inclined relative to the ground at a certain angle, second and third cutting elements comprising a pair of flat strips, each having one longitudinal edge thereof beveled and each having a length substantially equal to one third of the length of said lower open forward end of said bowl, said second and third cutting elements removably mounted to said lower open forward end of said bowl with said second and third cutting elements positioned on opposite sides of said first cutting element and in a longitudinal alignment therewith, said second and third cutting elements inclined at a certain angle relative to ground level and less than said certain angle of said one cutting element, the angles of inclination of said first, second and third cutting elements being selected so that when said scraper is moved forwardly said first cutting element operates to cut and direct one portion of the material being cut into the volume defined by said apron and said second and third cutting elements operate to cut and direct another substantially larger portion of the material being cut substantially into the volume defined by said bowl to completely fill the volume defined by said apron and said bowl.

References Cited in the file of this patent

UNITED STATES PATENTS

| | | |
|---|---|---|
| 1,674,110 | Harden | June 19, 1928 |
| 2,164,461 | Le Bleu | July 4, 1939 |
| 2,250,289 | Barrett | July 22, 1941 |
| 2,257,761 | Paulsen | Oct. 7, 1941 |
| 2,329,831 | Ferguson | Sept. 21, 1943 |
| 2,668,910 | Adair | Sept. 14, 1954 |
| 2,722,065 | Smith | Nov. 1, 1955 |
| 2,729,001 | Adams | Jan. 3, 1956 |